(12) United States Patent
Li et al.

(10) Patent No.: US 9,306,808 B2
(45) Date of Patent: Apr. 5, 2016

(54) SYSTEM AND METHOD FOR TOPOLOGY TRANSPARENT ZONING IN NETWORK COMMUNICATIONS

(71) Applicant: Futurewei Technologies, Inc., Plano, TX (US)

(72) Inventors: Renwei Li, Fremont, CA (US); Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/587,536

(22) Filed: Dec. 31, 2014

(65) Prior Publication Data

US 2015/0117265 A1 Apr. 30, 2015

Related U.S. Application Data

(63) Continuation of application No. 13/372,596, filed on Feb. 14, 2012, now Pat. No. 8,964,732.

(60) Provisional application No. 61/467,750, filed on Mar. 25, 2011.

(51) Int. Cl.
*H04L 12/56* (2006.01)
*H04L 12/24* (2006.01)
(Continued)

(52) U.S. Cl.
CPC ............... *H04L 41/12* (2013.01); *H04L 45/02* (2013.01); *H04L 45/025* (2013.01); *H04L 45/22* (2013.01); *H04L 45/28* (2013.01); *H04L 45/50* (2013.01)

(58) Field of Classification Search
CPC ............... H04L 12/2418; H04L 47/41; H04L 2001/0092; H04L 45/00; H04L 45/50; H04L 45/22; H04L 45/28

USPC .......... 370/328, 254, 299, 367, 396, 400, 404
See application file for complete search history.

(56) References Cited

U.S. PATENT DOCUMENTS

| 5,666,652 A | 9/1997 | Lin et al. |
| 6,085,102 A | 7/2000 | Dorenbosch |

(Continued)

FOREIGN PATENT DOCUMENTS

| CN | 1411214 A | 4/2003 |
| CN | 1889517 A | 1/2007 |

(Continued)

OTHER PUBLICATIONS

Wang, D., et al., "OSPF for routing information exchange across metro/core optical networks," XP001161643, Optical Networks Magazine, vol. 3, No. 5, Sep./Oct. 2002, pp. 34-43.

(Continued)

*Primary Examiner* — Ricky Ngo
*Assistant Examiner* — Dewanda Samuel
(74) *Attorney, Agent, or Firm* — Conley Rose, P.C.; Grant Rodolph; Brandt D. Howell

(57) ABSTRACT

An Autonomous System domain comprising a topology transparent zone comprising a plurality of topology transparent zone nodes at least some of which are topology transparent zone edge nodes, wherein the topology transparent zone nodes are interconnected with one another via a plurality of internal links, and a plurality of neighboring external nodes connected to the topology transparent zone edge nodes via a plurality of external links, wherein no link state advertisements (LSAs) describing the internal links are distributed to the neighboring external nodes.

17 Claims, 13 Drawing Sheets

(51) Int. Cl.
*H04L 12/723* (2013.01)
*H04L 12/707* (2013.01)
*H04L 12/703* (2013.01)
*H04L 12/751* (2013.01)

(56) References Cited

U.S. PATENT DOCUMENTS

| | | | |
|---|---|---|---|
| 6,801,496 B1* | 10/2004 | Saleh et al. | 370/221 |
| 6,980,524 B1* | 12/2005 | Lu | H04L 45/04 370/254 |
| 7,457,277 B1* | 11/2008 | Sharma et al. | 370/351 |
| 7,603,671 B2 | 10/2009 | Liu | |
| 8,018,873 B1* | 9/2011 | Kompella | 370/254 |
| 8,238,338 B2* | 8/2012 | Swallow et al. | 370/392 |
| 8,659,658 B2 | 2/2014 | Vassign et al. | |
| 2003/0016678 A1* | 1/2003 | Maeno | 370/400 |
| 2004/0226015 A1* | 11/2004 | Leonard | G06F 9/5061 718/100 |
| 2005/0152284 A1* | 7/2005 | Kotha et al. | 370/254 |
| 2006/0098657 A1* | 5/2006 | Vasseur et al. | 370/392 |
| 2006/0268739 A1* | 11/2006 | Garcia | H04L 41/12 370/254 |
| 2010/0322244 A1 | 12/2010 | Dasylva et al. | |

FOREIGN PATENT DOCUMENTS

| | | |
|---|---|---|
| CN | 101568124 A | 10/2009 |
| WO | 2010148500 A1 | 12/2010 |

OTHER PUBLICATIONS

Chen, H., et al., "OSPF Topology-Transparent Zone," draft-chen-ospf-ttz-01.txt, Mar. 12, 2012, 22 pages.
Chen, H., et al., "OSPF Topology-Transparent Zone," draft-chen-ospf-ttz-00.txt, Oct. 24, 2011, 20 pages.
Oran, D., Ed., et al., "OSI IS-IS Intra-domain Routing Protocol," Feb. 1990, RFC 1142, 157 pages.
Bradner, S., "Key Words for use in RFCs to Indicate Requirements Levels," RFC 2119, Mar. 1997, 3 pages.
Moy, J., et al., "OSPF Version 2," RFC 2328, Apr. 1998, 244 pages.
Coltun, R., "The OSPF Opaque LSA Option," RFC 2370, Jul. 1998, 15 pages.
Coltun, R., et al., "OSPF for IPv6," RFC 2740, Dec. 1999, 81 pages.
Katz, D., et al., "Traffic Engineering (TE) Extensions to OSPF Version 2," RFC 3630, Sep. 2003, 14 pages.
Aggarwal, R., et al., "Advertising a Router's Local Addresses in OSPF Traffic Engineering (TE) Extensions," RFC 5786, Mar. 2010, 8 pages.
Lindem, A., Ed., et al., "Extensions to OSPF for Advertising Optional Router Capabilities," RFC 4970, Jul. 2007, 13 pages.
Coltun, R., et al., "OSPF for IPv6," RFC 5340, Jul. 2008, 94 pages.
Vasseur, JP., Ed., et al., Path Computation Element (PCE) Communication Protocol (PCEP), RFC 5440, Mar. 2009, 87 pages.
Vasseur, JP., Ed., et al., "A Backward-Recursive PCE-Based Computation (BRPC) Procedure to Compute Shortest Constrained Inter-Domain Traffic Engineering Label Switched Paths," RFC 5441, Apr. 2009, 18 pages.
Foreign Communication From a Counterpart Application, PCT Application No. PCT/CN2012/073005, International Search Report dated Jul. 5, 2012, 9 pages.
Foreign Communication From a Counterpart Application, PCT Application No. PCT/CN2012/073005, Written Opinion dated Jul. 5, 2012, 6 pages.
Foreign Communication From a Counterpart Application, European Application No. 12763245.3, Extended European Search Report dated Mar. 19, 2014, 5 pages.
Notice of Allowance dated Oct. 3, 2014, 15 pages, U.S. Appl. No. 13/372,596, filed Feb. 14, 2012.
Office Action dated May 8, 2014, 27 pages, U.S. Appl. No. 13/372,596, filed Feb. 14, 2014.

* cited by examiner

SYSTEM AND METHOD FOR TOPOLOGY TRANSPARENT ZONING IN NETWORK COMMUNICATIONS

CROSS-REFERENCE TO RELATED APPLICATIONS

The present application is a continuation of U.S. patent application Ser. No. 13/372,596 filed Feb. 14, 2012 by Renwei Li et al., and entitled "System and Method for Topology Transparent Zoning in Network Communications," which claims priority to U.S. Provisional Patent Application No. 61/467,750 filed Mar. 25, 2011 by Renwei Li et al., and entitled "System and Method for Topology Transparent Zoning in Network Communications", both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Scalability and other issues begin to arise as conventional communications networks become larger and larger, e.g., comprising more and more nodes. In networks comprising a single Autonomous System (AS) domain (e.g., depicted below in FIG. 1), each node must be aware of the positional relationships (i.e., adjacencies) of all other nodes, such that all nodes may build a topological map of the network. Nodes may learn about one another's adjacencies by flooding link-state information throughout the network according to one or more interior gateway protocols (IGPs), e.g., open shortest path first (OSPF), intermediate system (IS) to IS (IS-IS), etc. Specifically, nodes engaging in IGPs may distribute their own link state advertisements (LSAs) describing their own adjacencies to all their neighboring nodes, which may forward the received LSAs to all their neighboring nodes (except the node from which the LSA was received). This may allow the LSA to be distributed throughout the network such that all network nodes become aware of one another's adjacencies, thereby allowing the various nodes to build topology tables (e.g., link state databases (LSDBs)). LSAs may be flooded upon network initialization as well as whenever a network adjacency changes (e.g., a node is added/removed, a node/link fails, etc.). Consequently, as more nodes are added to a network, link state distributions may begin to consume more and more network resources (e.g., bandwidth, processing, etc.), and consequently become more cumbersome and time-consuming.

The primary prior art technique for addressing scalability and performance issues in large networks is to define smaller local areas of IGP (e.g., open shortest path first (OSPF) areas, intermediate system (IS) to IS (IS-IS) areas, etc.) in an attempt to reduce the number of LSAs that are flooded throughout the network This technique (e.g., depicted below in FIG. 2) has been described by various publications, such as the Internet Engineering Task Force (IETF) publication request for comments (RFC) 2328 entitled "OSPF Version 2" (describing OSPF areas in an AS domain) and IETF publication RFC 1142 entitled "Open Systems Interconnection (OSI) IS-IS Intra-domain Routing Protocol" (describing IS-IS areas in an AS domain). Specifically, each OSPF/IS-IS area comprises a number of interconnected routers, including both area border routers (ABRs) and internal routers. ABRs may be distinguished from internal routers in that ABRs may be connected to external nodes (e.g., ABRs in other OSPF/IS-IS domains), while internal routers may be connected only to other nodes within the OSPF/IS-IS domain (e.g., not connected to any routers outside the OSPF/IS-IS domain). In most applications, the ABRs and internal routers will execute a normal link state distribution (e.g., according to an IGP) within their respective local OSPF/IS-IS areas, thereby allowing the ABRs to collect and summarize topology information (e.g., construct summary LSAs) describing their local OSPF/IS-IS area. Thereafter, the ABRs may distribute these summary LSAs to other ABRs on the backbone (e.g., to all other ABRs to which it is connected), thereby allowing the ABRs in external domains to develop a complete or partial topological understanding of the OSPF/IS-IS areas along the backbone. Depending on the network configuration, these summarized LSAs may or may not be distributed to internal nodes within the other OSPF/IS-IS routers).

Hence, while the prior art method reduces the number of LSAs that are flooded throughout the network, the fact remains that a localized link state distribution in one OSPF/IS-IS area (e.g., describing a change to an internal adjacency within the OSPF/IS-IS area) may lead to link state distributions to other areas, which may trigger routers in those other areas to re-calculate their OSPF or IS-IS routes, update their Routing Information Base (RIB) and Forwarding Information Base (FIB) tables, or take other actions that consume network resources (e.g., bandwidth and Central Process Unit (CPU) resources).

In an environment of multiple areas or domains, it requires the utilization of intermediate Path Computation Elements (PCEs) to facilitate inter-domain Link State Protocol (LSP) computation. However, PCEs make the network management become more complex. As such, a simple and efficient manner for addressing scalability/convergence problems in large networks is desired.

SUMMARY

Disclosed herein is an Autonomous System domain comprising a topology transparent zone comprising a plurality of topology transparent zone nodes at least some of which are topology transparent zone edge nodes, wherein the topology transparent zone nodes are interconnected with one another via a plurality of internal links, and a plurality of neighboring external nodes connected to the topology transparent zone edge nodes via a plurality of external links, wherein no link state advertisements (LSAs) describing the internal links are distributed to the neighboring external nodes.

Also disclosed herein is a method of configuring a topology transparent zone in an Autonomous System domain comprising configuring a topology transparent zone identifier (ID) on a plurality of internal links that interconnect a plurality of topology transparent zone nodes located within the topology transparent zone, wherein each of the internal links interconnects a pair of the topology transparent zone nodes, sending a common router advertisement via a plurality of external links to each of a plurality of neighboring external nodes located in the Autonomous System domain, wherein each neighboring external node is connected to at least one of the topology transparent zone nodes via at least one of the external links, and building or updating topology tables in the neighboring external nodes based on the common router advertisement, wherein the topology tables describe the topology transparent zone as a single router associated with a router ID that is equivalent to the topology transparent zone ID.

Also disclosed herein is a topology transparent zone in an Autonomous System domain comprising a plurality of interconnected topology transparent zone nodes comprising at least some topology transparent zone edge nodes, wherein the topology transparent zone edge nodes are connected to a plurality of neighboring external nodes in the Autonomous System domain via a plurality of external links, and a plurality of internal links each of which interconnects a pair of the topology transparent zone nodes, wherein the topology transparent zone nodes exchange a plurality of LSAs with one another describing the internal links without distributing any link state information related to the topology transparent zone's inner-topology to any of the external nodes, and wherein a common router advertisement is constructed and distributed to the neighboring external nodes.

Also disclosed herein is an Autonomous System domain comprising a first topology transparent zone comprising a first plurality of topology transparent zone nodes that are interconnected with one another to form the first topology transparent zone's inner-topology, a second topology transparent zone comprising a second plurality of topology transparent zone nodes that are interconnected with one another to form the second topology transparent zone's inner-topology, and a plurality of network nodes that are interconnected with the first topology transparent zone and the second topology transparent zone to form an Autonomous System domain topology, wherein each of the first plurality of topology transparent zone nodes comprise a first link state database (LSDB) describing the Autonomous System domain topology and the first topology transparent zone's topology, but not the second topology transparent zone's topology.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method and architecture for creating one or more topology transparent zones (TTZs) in a network to better address scalability and convergence problems in large networks. Specifically, the implementation of TTZs may be more effective in reducing link state distributions than networks implementing local OSPF/IS-IS areas, while (at the same time) less complex than networks implementing PCE Communication Protocol (PCEP) for computing a path for Multi-Protocol Label Switching Traffic Engineering LSP (MPLS TE LSP) crossing multiple domains Like local OSPF/IS-IS areas, TTZs may comprise a plurality of interconnected nodes (e.g., TTZ nodes), including nodes connected to external nodes (e.g., TTZ edge nodes) and nodes that are only connected to nodes within the TTZ (e.g., TTZ internal nodes). However, unlike the local OSPF/IS-IS areas, the TTZ edge nodes may not distribute LSAs describing the TTZ's internal topology (e.g., adjacencies between pairs of TTZ nodes) outside of the TTZ, and consequently link state distributions throughout the network may be reduced. Further nodes within the TTZ have a topological understanding of the AS domain as a whole. Consequently, LSPs can be computed without relying on intermediaries (e.g., PCEs). As such, the TTZ techniques described herein may allow for improved network scalability (e.g., faster re-convergence, better performance, and reduced processing consumption), while still allowing LSPs to be computed simply (i.e., without using intermediaries).

Figure 1:
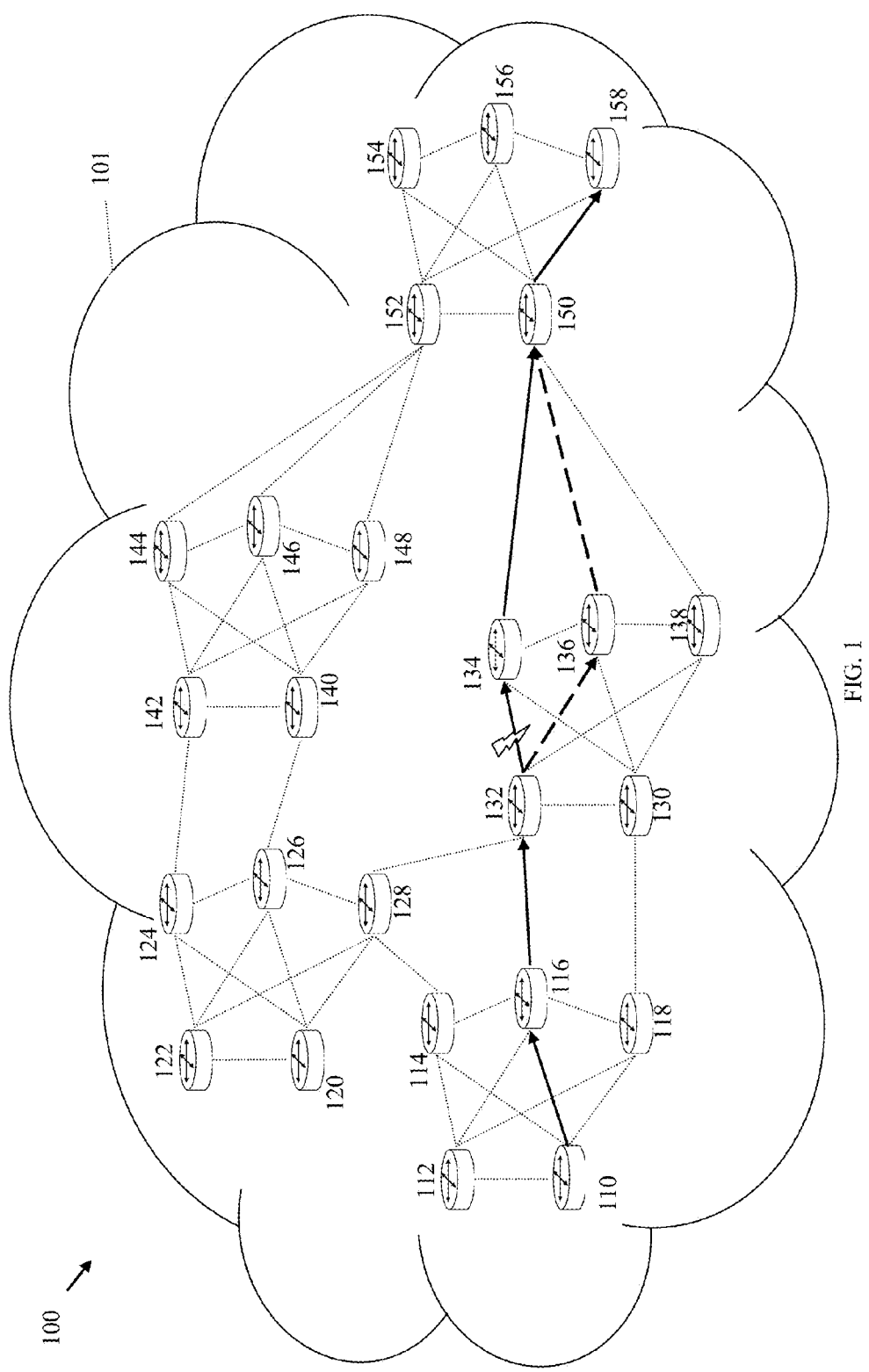
FIG. 1 illustrates an embodiment of a network comprising an undivided AS domain.

FIG. 1 illustrates a network 100 comprising a single AS domain 101 comprising a plurality of nodes 110-158 that collectively engage in a common link state distribution. Specifically, the nodes 110-158 may include a source node 110, a plurality of intermediate nodes 112-156, and a destination node 158, which are interconnected to form the AS domain's 101 internal architecture (referred to herein as a network topology). The nodes 110-158 may be any devices capable of switching data in a deterministic manner throughout the AS domain 101, and may comprise one or more tables (e.g., LSDB, RIB and FIB tables) containing link state information that describes the AS domain's 101 topology. In an embodiment, an LSP (solid arrows) may be established across the AS domain 101, which may allow traffic to be transported in a deterministic manner from one end of the network 100 to the other. As shown, the LSP may extend from a source node 110 to a destination node 158 via one or more of the intermediate nodes 112-156.

As the network 100 begins to grow larger and larger (e.g., comprising more and more nodes), scalability issues may arise. Specifically, scalability issues may relate to various network problems resulting from the inability to efficiently manage/distribute network topology information in a large network. For instance, the processing and storage capabilities/capacities of an individual node (e.g., node 132) may practically limit the size of the network 100. Additionally, the ability to distribute link state information in a timely manner (e.g., convergence) may be directly related to the number of nodes in which LSAs must be exchanged/flooded, and consequently larger networks may suffer from longer convergence periods (e.g., the period required to build/update topology tables). As used herein, topology tables may correspond to LSDBs, or any other table that is used to describe the topology of a corresponding network, AS domain, local area, or TTZ. Re-convergence in large networks may also be an issue, as the inability to timely recover from a fault in a node/link (or some other condition that changes a network adjacency subsequent to initialization) may disrupt network services (e.g., LSPs established in the network). Specifically (in the event of a fault in the network), it may be necessary to flood LSAs throughout the network 100 to inform each of the network nodes 110-158 of the change in network topology. As used herein, the length of time required to distribute the topology information throughout the network (and update the appropriate RIB/FIB tables in the relevant nodes) may be referred to as a re-convergence period (or a convergence period if occurring during network initialization).

Re-convergence periods may significantly impact the ability to timely recover from faults in an LSP (e.g., LDP LSP), and therefore substantially affect the maximum Quality of Service (QoS) level supported by the network. Specifically, a network fault may affect one or more LSPs, which may be broken until a recovery procedure can be completed. For instance, a fault in the node 134 (or the link between the nodes 132 and 134) may cause the LSP (solid arrows) to be temporarily broken. In response to detecting the fault, one or more of the nodes 110-158 may flood LSAs throughout the network to inform the other nodes of the topological change (i.e., that the adjacency between the nodes 132 and 134 no longer exists, or is temporarily unavailable). Subsequently, one or more of the nodes 110-158 may be recomputed or otherwise repair the LSP (as depicted by the dashed lines) in accordance with various known recovery mechanisms. Only after the LSP has been restored, can transportation of the network traffic resume. Hence, re-convergence periods directly affect the ability to timely recover from faults in an LSP, and therefore substantially affect the ability of networks to meet QoS requirements of their various service agreements.

Figure 2:
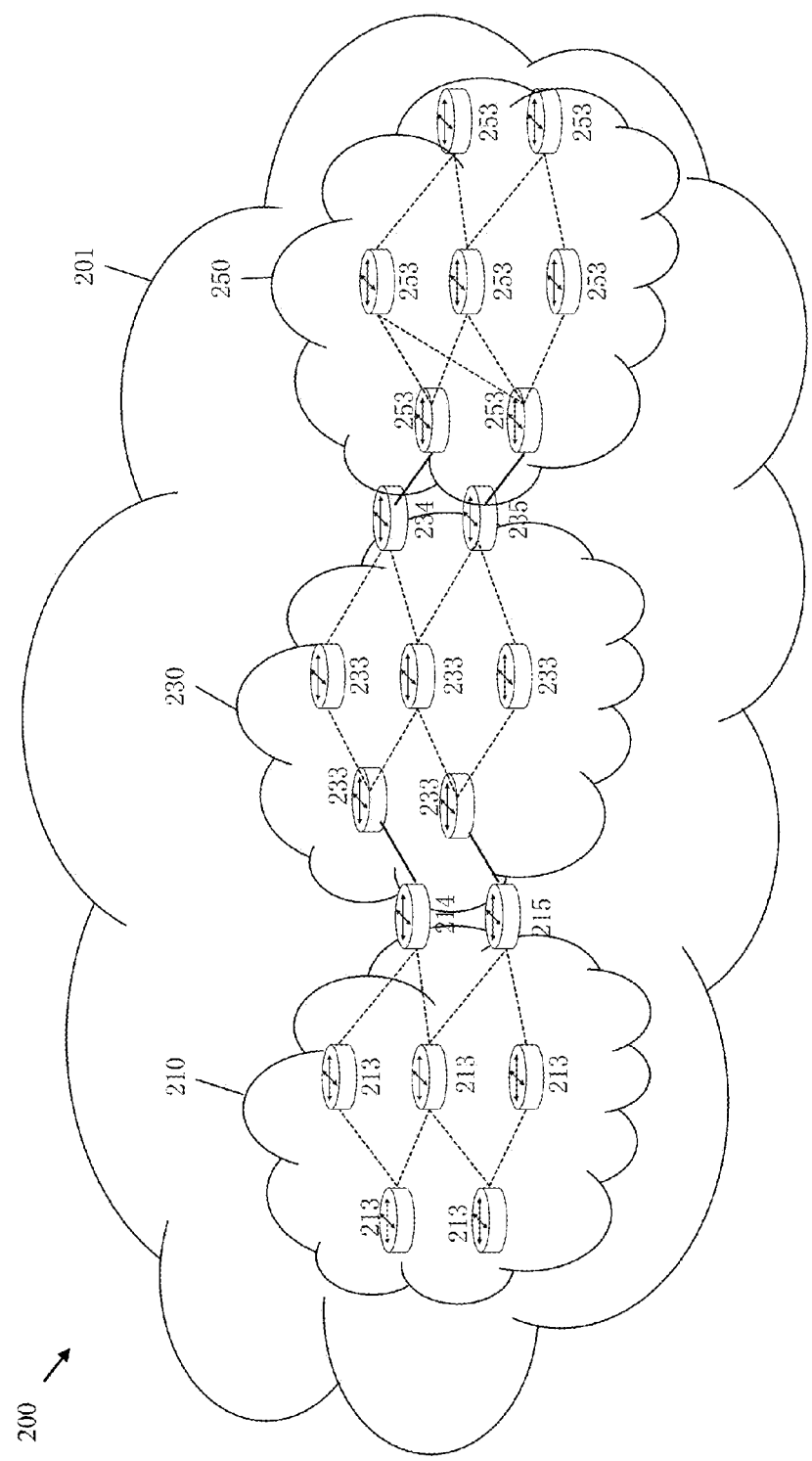
FIG. 2 illustrates an embodiment of a network comprising an AS domain that is divided into a plurality of OSPF/IS-IS areas.

As discussed above, the prior art techniques for dealing with scalability/convergence issues in large networks involves defining OSPF/IS-IS areas within the network's AS domain. FIG. 2 illustrates a network 200 comprising an AS domain 201, which has been divided into a plurality of local areas (e.g., OSPF/IS-IS areas). Specifically, the AS domain 201 may comprise a plurality of local areas 210, 230, and 250. Although only three local areas 210, 230, and 250 are depicted, those of ordinary skill in the art will understand that the AS domain 201 may comprise any number of local areas (e.g., tens or even hundreds of OSPF/IS-IS areas). The local area 210 may comprise a plurality of border nodes 214, and 215 as well as a plurality of internal nodes 213. The border nodes 214, and 215 are connected to external nodes (i.e., nodes outside the local area 210), while the internal nodes 213 are only connected to internal nodes (i.e., nodes inside the local area 210). The local area 230 may comprise a plurality of border nodes 214, 215, 234, and 235 as well as a plurality of internal nodes 233, which may be configured similar to the corresponding nodes 214-215 in the local area 210. The local area 250 may comprise a plurality of border nodes 234, and 235 as well as a plurality of internal routers 253, which may be configured similar to the corresponding nodes 214-215 in the local area 210.

LSAs comprising local link state information that is relevant to the local area 210 is distributed (e.g., flooded) to all the nodes 213-215 within the local area 210 (but not to the nodes 233, 234, and 235). Accordingly, the border nodes 214, and 215 may collect and summarize the local link state information into a summary LSA, and subsequently forward the summary LSA to the relevant external nodes (i.e., the external node 233, and the border nodes 234, 235). The summary LSAs are flooded within the local area 230. The border nodes 234, 235 may then flood the summarized LSAs throughout the local area 250. Hence, dividing the AS domain 201 into the local areas 210, 230, and 250 may decrease link state distributions in the AS domain 201, thereby saving network resources (e.g., bandwidth, etc.) in comparison to the network 100. However, a link state distribution in the local area 210 nevertheless triggers at least some link state distributions throughout the AS domain 201, which may cause other nodes (e.g., 233-235, 253) to re-calculate their OSPF or IS-IS routes, update their RIB and FIB tables, or take other actions that consume network resources (e.g., bandwidth and CPU resources). Hence, while the prior art technique of dividing an AS domain into a plurality of OSPF/IS-IS areas partially addresses scalability/convergence issues, it fails to fully localize the distribution of local link state information within the relevant OSPF/IS-IS areas.

Figure 3:
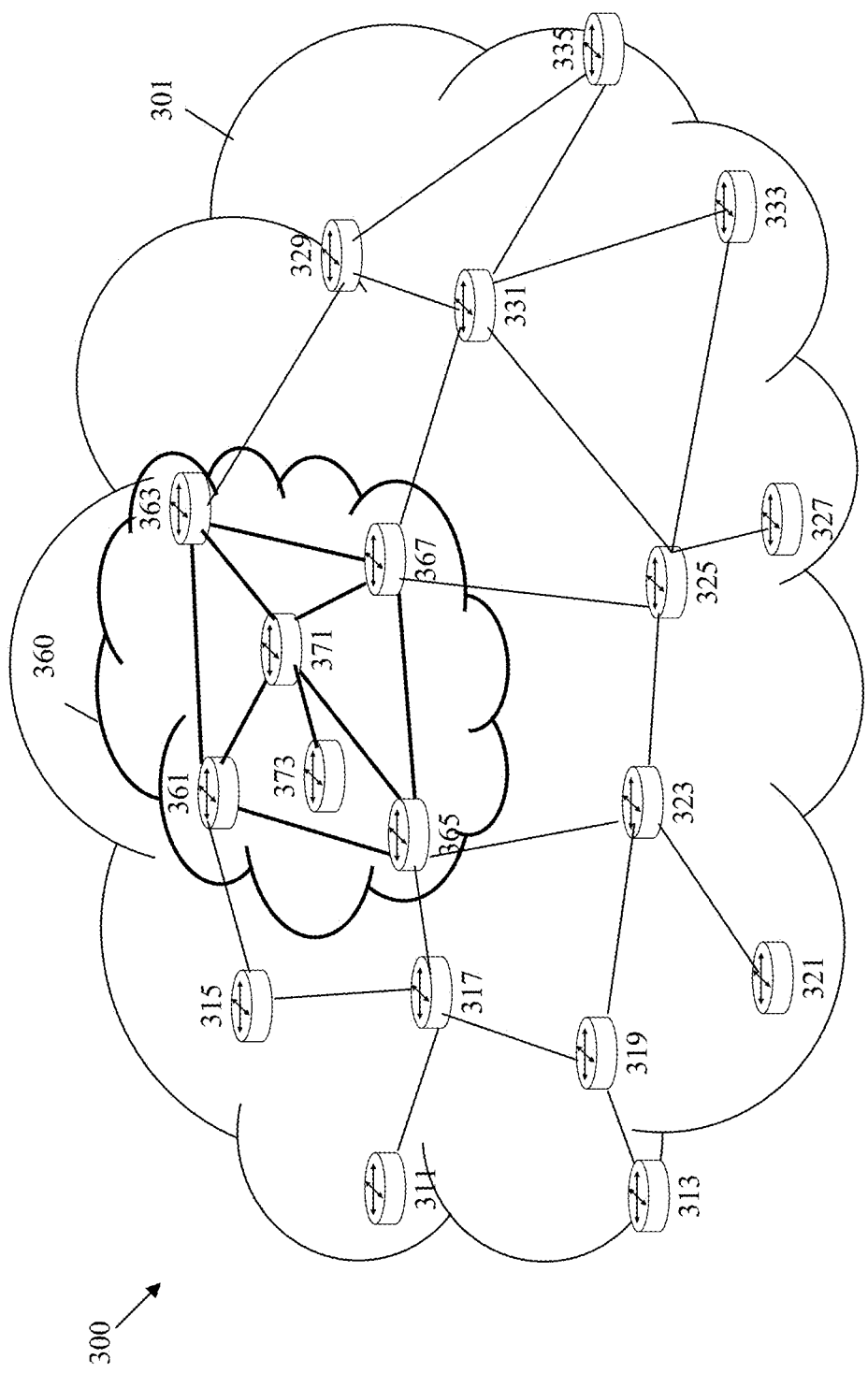
FIG. 3 illustrates an embodiment of a network comprising an AS domain that is partially divided into a Topology Transparent Zone (TTZ).

In contrast, the TTZ approach disclosed herein completely localizes the distribution of local link state information within the relevant TTZ. FIG. 3 illustrates an embodiment of a network 300 comprising an AS domain 301 in which an exemplary TTZ approach is employed. Specifically, the AS domain 301 may comprise a plurality of nodes 311-335 and a topology transparent zone (TTZ) 360. The nodes 311-335 may be configured similar to the nodes 110-158, and may share link state information with one another (as well as with the TTZ 360) via an appropriate IGP (e.g., OSPF, IS-IS, etc.).

The TTZ 360 may comprise a plurality of TTZ nodes 361-373, which may (more precisely) include TTZ edge nodes 361, 363, 365 and 367, and a plurality of TTZ internal nodes 371 and 373. As used herein, both TTZ edge nodes and TTZ internal nodes may be referred to as TTZ nodes. Each of the TTZ edge nodes 361, 363, 365 and 367 may be connected to at least one node outside of the TTZ 360, e.g., the TTZ edge node 361 may be connected to the node 315. The TTZ internal nodes 371 and 373 may not be connected to any node outside of the TTZ 360, e.g., the TTZ internal node 371 is only connected to TTZ nodes 361, 363, 365, 367 and 373, but no nodes/nodes outside the TTZ 360.

Link state information relevant only to the inner-topology of the TTZ 360 (e.g., concerning internal links or adjacencies between pairs of TTZ nodes) may be flooded only within the TTZ 360 (i.e., not distributed to nodes outside the TTZ 360). Hence, the nodes 311-335 may not receive LSAs describing the TTZ's 360 inner-topology, and as a result may not be able to "see" into (e.g., view) the TTZ's 360 inner-topology. Instead, the nodes 311-335 may view the TTZ as a single router/node. The term node and router may be used interchangeably herein.

The TTZ 360 may be assigned a single router Identifier (ID). Router IDs that are assigned to TTZs (such as the TTZ 360) may be referred to herein as TTZ IDs, and may be configured on each link within the relevant TTZ such that the interconnected TTZ nodes (i.e., nodes on either side of the link) recognize that the link is inside the TTZ. In other words, configuring the TTZ ID on the link indicates/specifies that the link is a TTZ link. In an embodiment, a TTZ ID may be configured on a link by associating the link with the TTZ ID in each interconnected node. For instance, the TTZ ID corresponding to the TTZ 360 may be configured on the link extending between the TTZ internal nodes 371 and 373, which triggers the updating of an appropriate table (e.g., a link table) in each of the TTZ internal nodes 371 and 373 to associate the link (or a port corresponding to the link) with the TTZ ID. This procedure may serve to indicate that the configured link is inside the TTZ 360 from the perspective of each of the TTZ internal nodes 371 and 373.

The TTZ 360 may be formed after every link inside the TTZ 360 is configured with the same TTZ ID (e.g., the nodes on both sides of each internal link associate the link with the TTZ ID). For instance, the TTZ 360 may be formed by configuring the same TTZ ID on each link within the TTZ 360, including the link between TTZ nodes 361 and 365, the link between TTZ nodes 365 and 367, the link between TTZ nodes 367 and 363, the link between TTZ nodes 363 and 361, the link between TTZ nodes 371 and 361, the link between TTZ nodes 371 and 363, the link between TTZ nodes 371 and 365, the link between TTZ nodes 371 and 367, and the link between TTZ nodes 371 and 373. Once the links have been configured with the TTZ ID corresponding to the TTZ 360, then the TTZ's 360 internal topology may be defined by the six TTZ nodes 361, 363, 365, 367, 371, and 373, as well the links extending there between.

From the perspective of the external nodes 311-335, the TTZ 360 may be "seen" (e.g., viewed, or otherwise recognized) as a single node having a single router ID. In some embodiments, the router ID may be equal to a global TTZ ID, although it may also be equal to the smallest or largest router ID assigned to the TTZ nodes. Further, the external nodes 311-335 may "see" (e.g., view, or otherwise recognize) a plurality of links connected to the TTZ 360 as ingress/egress interfaces belonging to a single node. For instance, node 315 may "see" the TTZ 360 as a single node with six interfaces connected to the nodes 315, 317, 323, 325, 331, and 329.

Figure 4:
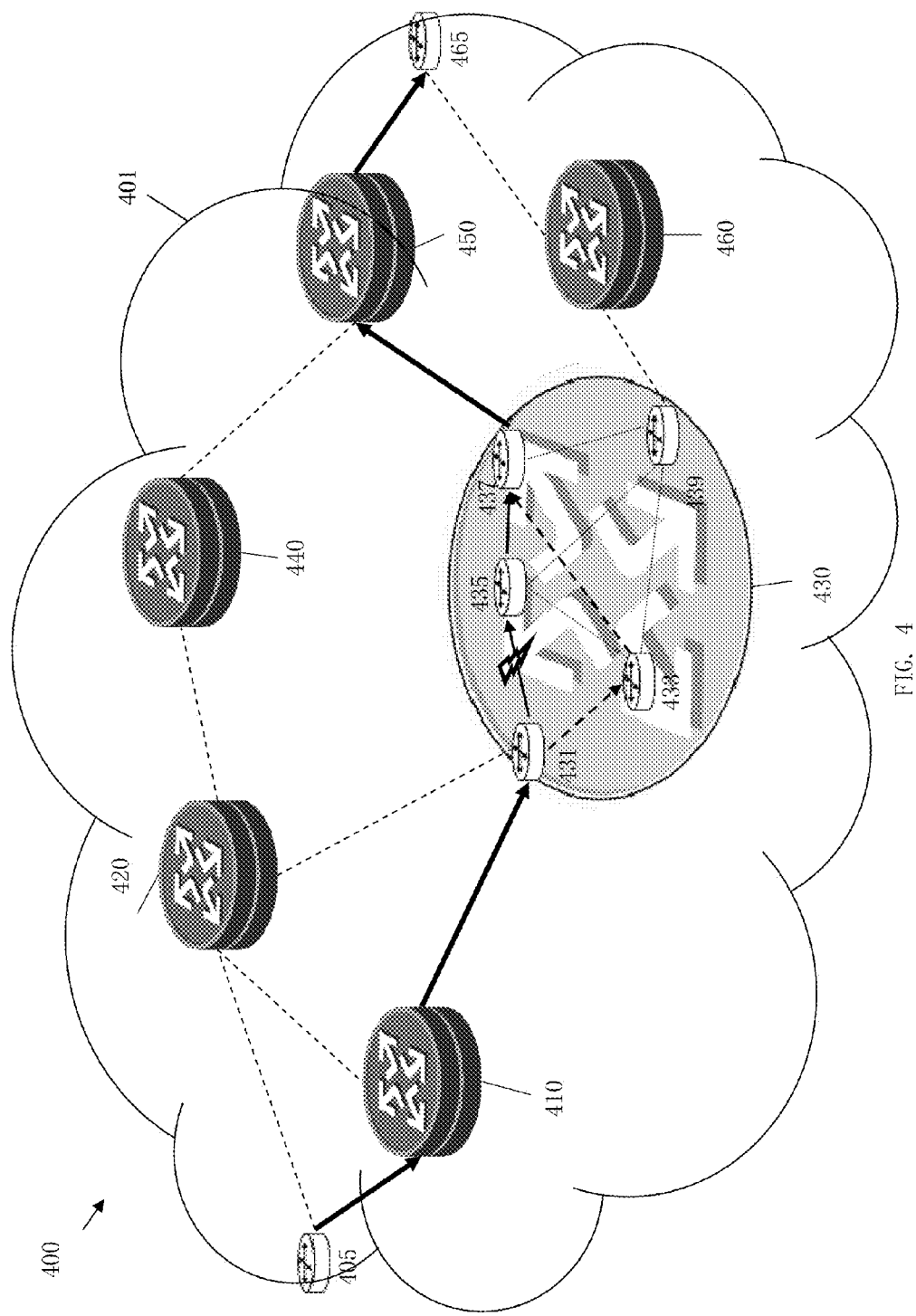
FIG. 4 illustrates a perspective of a network from the point of view of a TTZ node residing within an instant TTZ.

FIG. 4 illustrates a perspective of a network 400 from the point of view of a node residing within an instant TTZ. The network 400 comprises an AS domain 401, comprising a plurality of external nodes 405 and 465, a plurality of non-instant TTZs 410, 420, 440, 450, and 460, and an instant TTZ 430. Each of the TTZs 410, 420, 430, 440, 450, and 460 may be configured similarly, such that none of the link state information relevant only to a TTZ's inner-topology is distributed outside of the respective TTZ. The instant TTZ comprises a plurality of nodes 431-439, each of which may be able to "see" the instant TTZ's 430's inner-topology, as well as the topology of the AS domain 401. However, the nodes 431-439 cannot "see" the inner-topologies of any of the non-instance TTZs' 410, 420, 440, 450, and 460. Instead, the non-instant TTZs 410, 420, 440, 450, and 460 appear as single routers/nodes from the perspective of the nodes 431-439 located within the TTZ 430.

One application of the TTZ techniques described herein may be to configure a point-of-presence (POP) (e.g., a floor or a room of routers) as a TTZ, in which case the entire POP may behave as a single router (i.e., the internal routers/links in the POP are hidden from external nodes). As is the case with other implementations, the TTZ approach described herein may allow for greater scalability, simpler computation/establishment of LSPs, faster routing re-convergence (e.g., after a fault), improved performance, and higher availability in POP applications.

Scalability may relate to the ability to quickly and effectively distribute link state information to relevant nodes within a network or domain. For instance, a standard AS domain comprising 1,000 routers (i.e., no TTZs) may require the distribution of at least 1000 LSAs to build a link state database (LSDB) in each of the respective nodes. In contrast, the number of LSAs can be reduced significantly by dividing the network into TTZs. For instance, if the network is divided into 200 TTZs (each of which containing about five routers), then the LSDBs may be established using about 205 LSAs (e.g., 200 TTZ-to-TTZ router LSAs, and 5 LSAs within each TTZ (which may occur concurrently, with a far smaller flooding spectrum)), thereby achieving a scalability savings of about 79.5% ((1000−205)/1000). Additional savings can be had when the network is divided into fewer (e.g., larger) TTZs. For instance, if the 1000 node network is divided into 100 TTZs (each comprising about ten routers), then scalability savings of about 89% ((1000−110)/1000), (e.g., about one order of magnitude), may be achieved. In larger networks, the scalability savings may be even more significant. For instance, by dividing a network comprising about 200,000 routers into about 1,000 TTZs (each comprising about 200 routers), scalability savings of about 99.4% ((200,000−1,200)/200,000), (e.g., or about two orders of magnitude), may be achieved.

The TTZ method disclosed herein also allows for faster/simpler computation and/or establishment of end-to-end (E2E) LSPs (e.g., LSPs spanning from one end of the AS domain to the other). In conventional local OSPF/IS-IS area networks, computation of E2E LSPs can be quite complicated, oftentimes requiring the utilization of intermediate path computation entities (PCEs). In contrast, the TTZ approach disclosed herein allows for the relatively simple computation and establishment of E2E LSPs. As shown in FIG. 4, an LSP (solid arrows) is established between the external router 405 and the external router 465. Specifically, the portion of the LSP existing outside the TTZs 410, 430, and 450 may be computed (e.g., by the external router 405, and may thereafter be established by conventional means (e.g., a PATH message, etc.). For instance, the LSP may be established between the external node 405 and the TTZ 410, then between the TTZ 410 and the TTZ node 431, between the TTZ node 431 and the TTZ node 437, then between the TTZ node 437 and the TTZ 450, and finally between the TTZ 450 and the external node 465. Subsequent thereto (or in conjunction therewith), the portion of the LSP existing inside the TTZs 410, 430, and 450 may be computed/established. For instance (in the instant TTZ 430), the LSP may be established between the TTZ node 431 and the TTZ node 435, and then between the TTZ node 435 and the TTZ node 437. Similar steps may occur to establish the portions of the LSP within the TTZs 410 and 450. Hence, E2E LSPs can be set up without the use of PCEs (or other external databases/CPUs). In some embodiments, the portions of the LSP may be computed independently, and established concurrently by a common mechanism (e.g., a single PATH message, or a string of PATH messages). For instance, the portions of the LSP existing outside the TTZs 410, 430, and 450 may be computed by the external router 405, while the respective portions of the LSP extending through each TTZ may be computed by a respective router (e.g., the TTZ node 431, etc.) in each of the TTZs 410, 430, and 450.

Additionally, the TTZ approach disclosed herein may significantly reduce re-convergence time, thereby allowing quicker fault recovery (e.g., shorter re-convergence times). For instance, if a fault occurs in the portion of the LSP extending between the TTZ node 431 and the TTZ node 435, then a corresponding backup portion of the LSP (dashed arrow) can be quickly computed and established between the TTZ nodes 431, 433, and 437 without any link state distributions occurring outside the TTZ 430. Thus, routers outside the TTZ 430 will not notice a topology change, and (as an added benefit) will not re-calculate their routing tables (i.e., saving CPU resources, thereby increasing the "availability" of said resources for other tasks). This scenario may also occur when a POP (e.g., configured as a TTZ) is reconstructed or re-structured, in which case the routers outside the TTZ will not be affected. As such, localization of Link state distributions relevant only to the TTZ's 430 inner-topology not only significantly reduces the re-convergence period, but also allows LSP recovery to occur transparently (i.e., without notifying the external nodes 405, 465 and the TTZs 410, 450).

Moreover, the TTZ approach disclosed herein allows for higher availability by not consuming CPU resources outside the TTZ area. Specifically, conventional OSPF/IS-IS area networks flood summary LSAs throughout the network (e.g., between OSPF/IS-IS ABRs, and then within the external OSPF/IS-IS networks), thereby consuming processing resources outside of the OSPF/IS-IS area. In contrast, the TTZ approach disclosed herein completely localizes the LSAs within the TTZ 430, and consequently avoids unnecessarily consuming external processing resources.

Figure 5:
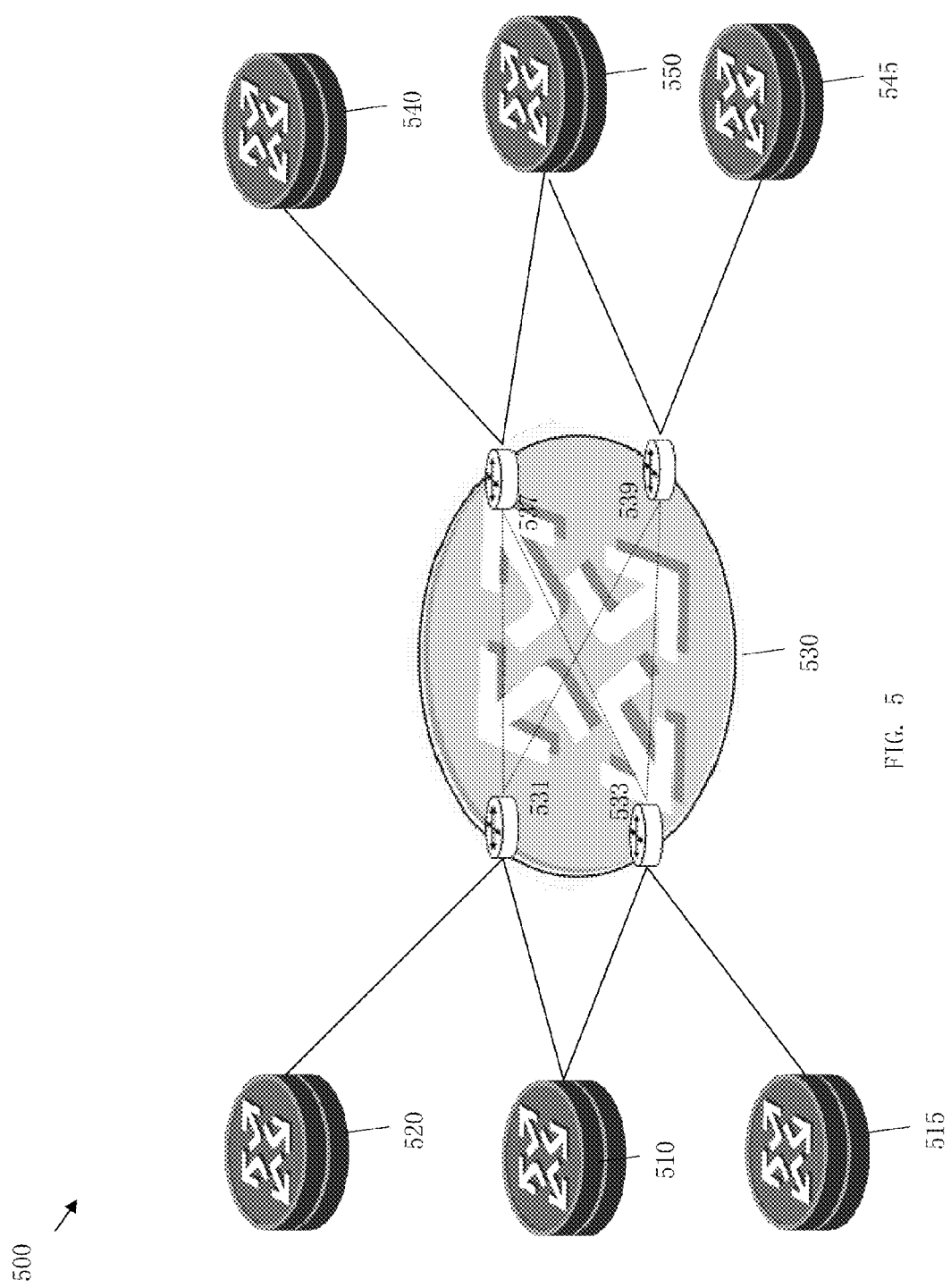
FIG. 5 illustrates an embodiment of a TTZ router comprising six interfaces.

The TTZ approach described herein also allows for improved network performance. In some embodiments, TTZs may employ TTZ edge routers with more than two interfaces (e.g., four, six, eight, etc.). FIG. 5 illustrates a network 500 comprising a TTZ router that has eight interfaces. Specifically, the network 500 may comprise a plurality of TTZs 510, 515, 520, 540, 545, 550, and an instant TTZ 530, which may be configured similar to the TTZs 410-460 discussed above. The instant TTZ 530 may comprise four TTZ edge routers 531-539, each of which comprises four interfaces. Hence, the TTZ 530 may have eight interfaces, thereby achieving about twice (e.g., 8/4) the throughput of a single quad-interface router. For instance, if the TTZ edge routers 531-539 are 40 gigabyte (G) routers (e.g., four 10G/interface), then the TTZ 530 may provide a throughput of about 80 Gs.

Figure 6:
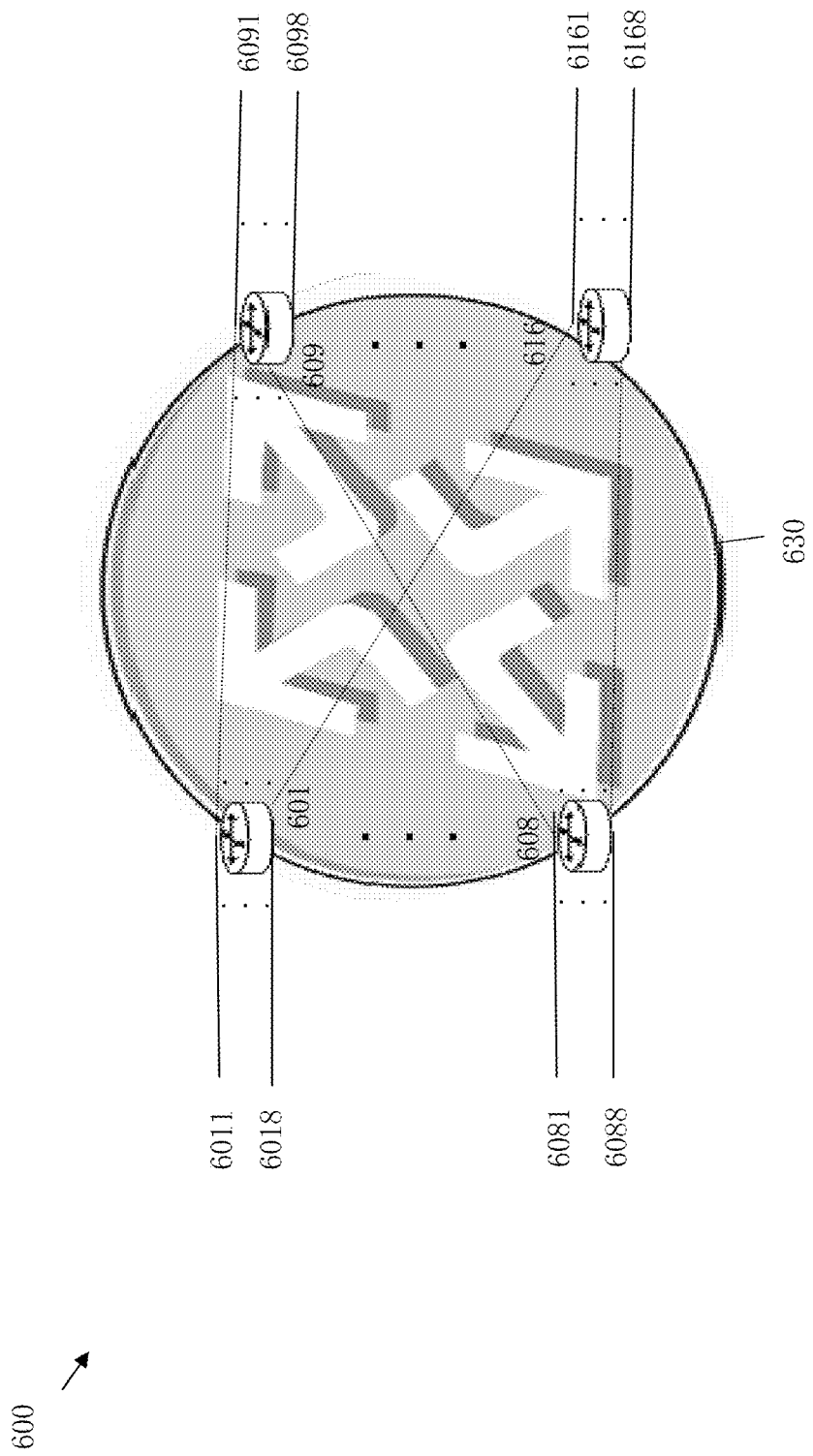
FIG. 6 illustrates an embodiment of a TTZ router comprising 128 interfaces.

In still other embodiments, TTZs may employ TTZ edge routers having even more interfaces and/or even more TTZ edge routers. FIG. 6 illustrates a network 600 comprising a TTZ router that has 128 interfaces. Specifically, the network 600 comprises an instant TTZ 630 (the non-instance TTZs have been omitted for clarity purposes) configured similar to the TTZ 430 discussed above, which may comprise sixteen TTZ edge routers 601-616. Each of the TTZ sixteen routers 601-616 may comprise about sixteen 100G interfaces (e.g., the TTZ edge router comprises sixteen interfaces, eight of which are the interfaces from the interface 6011 to the interface 6018, eight of which are the interfaces from the interface 6091 to 6098, eight of which are the interfaces from the interface 6081 to 6088, and eight of which are the interfaces from the interface 6161 to 6168) for a total throughput of about 1.6 terabytes (1.6 T) per TTZ edge router 601-616, thereby allowing the TTZ 630 achieving a throughput of about 12.8 T (or about 8 times that of the individual 1.6 T routers). Those of ordinary skill will understand that while the TTZ 630 in the implementation depicted in FIG. 6 comprises sixteen TTZ edge routers and 128 interfaces, TTZs in other implementations may comprise more or fewer interfaces and/or routers (e.g., higher/lower throughput routers, etc.).

Figure 7:
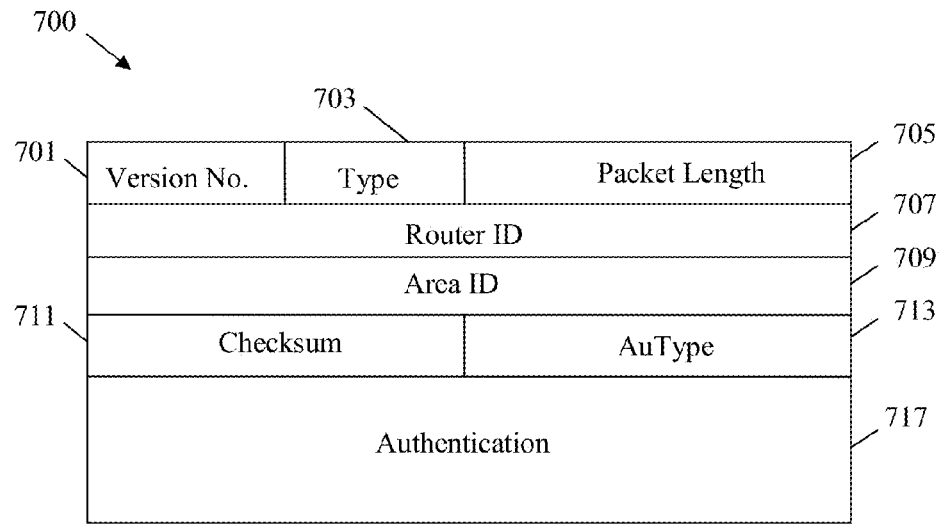
FIG. 7 illustrates an embodiment of an IGP packet header.

FIG. 7 illustrates an embodiment of an interior gateway protocol (IGP) packet header 700, which may be similar to an OSPF packet header. The packet header 700 comprises a Version Number (No.) field 701, a Type field 703, a Packet Length field 705, a Router ID field 707, an Area ID field 709, a Checksum field 711, an Authentication Type (AuType) field 713, and an Authentication field 717. The Version No. field 701 may comprise an OSPF protocol version number, which (in an embodiment) may be set to about two to indicate its compatibility with version 2 of the OSPF protocol. The Type field 703 may indicate a type of OSPF packet, and may be set to about one, two, three, four, or five to indicate that the corresponding OSPF packet is a Hello packet, a Database Description packet, a Link State Request packet, a Link State Update packet, or a Link State Acknowledgement packet (respectively). The value of Packet Length field 705 may indicate the length of the OSPF protocol packet (including the standard OSPF header) in bytes. The value of Router ID field 707 may indicate the router ID of the source router (i.e., the router that originally transmitted the packet corresponding to the packet header 700). The value of the Area ID field 709 may comprise a 32 bit number identifying the area (e.g., OSPF area) that the corresponding packet describes or is otherwise associated with. The value of Checksum field 711 may indicate the standard IP checksum of the entire contents of the packet, starting with the OSPF packet header (but excluding the 64-bit Authentication field 717). The value of the AuType field 713 may identify the authentication procedure to be used for the packet, and may be about zero, one, or two to indicate a Null authentication, a Simple password, or a Cryptographic authentication (respectively). The Authentication field 717 may be a 64-bit field that is used for authentication.

In an embodiment, the value of Router ID field 707 may comprise an appropriate TTZ ID when a TTZ (edge) node sends a packet comprising the header 700 to another node (e.g., outside the TTZ ID). For instance, the TTZ edge node 361 (in FIG. 3) may set the value of Router ID field 707 to a TTZ ID corresponding to the TTZ 360 when constructing and sending IGP packets to the node 315 (i.e., a node outside of the TTZ 360). In another embodiment, the value of Router ID field 707 may comprise the biggest router ID or the smallest router ID among the router IDs of the TTZ nodes in the TTZ by the TTZ edge node when a TTZ edge node sends a packet comprising the header 700 to another node (e.g., outside the TTZ ID). For instance, suppose that the router IDs of the TTZ nodes 361, 363, 365, 367, 371 and 373 are 10.1.1.161, 10.1.1.163, 10.1.1.165, 10.1.1.167, 10.1.1.171 and 10.1.1.173 (respectively). Upon sending a packet to the node 315 (i.e., a node outside the TTZ 360), the TTZ edge node 361 may set the value of Router ID 707 field to the biggest router ID (i.e., 10.1.1.173) or the smallest router ID of (i.e., 10.1.1.161) of the TTZ 360.

Figure 8:
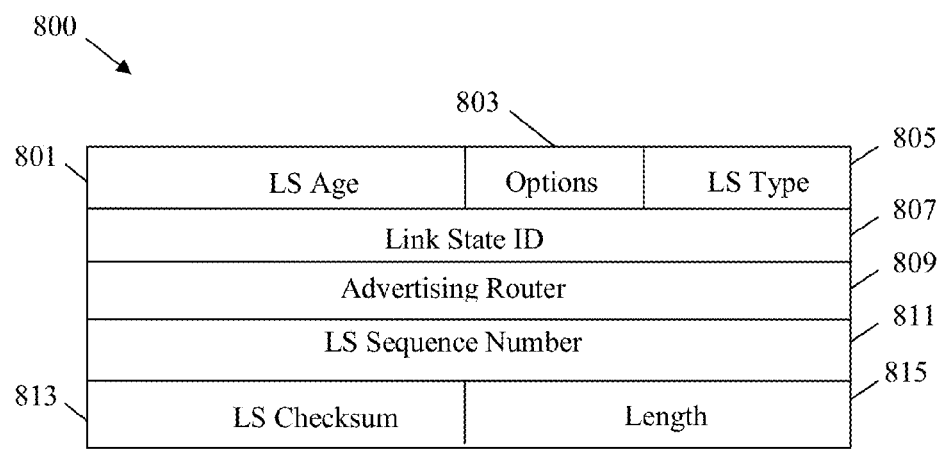
FIG. 8 illustrates an embodiment of a Link State Advertisement (LSA) header.

FIG. 8 illustrates an embodiment of an LSA header 800 comprising link state age (LS Age) field 801, an Options field 803, a link state type (LS Type) field 805, a Link State ID field 807, an Advertising Router field 809, a Link State Sequence Number field 811, a Link State Checksum field 813, and a Length field 815. In an embodiment, all LSAs may begin with the LSA header 800, and the LS Type field 805, the Link State ID field 807, and the Advertising Router field 809 may be used to uniquely identify the LSA. The value of LS Age field 801 may indicate a time (in seconds) since the LSA originated. The value of Options field 803 may indicate one or more optional capabilities supported by the corresponding portion of the routing domain. In an embodiment, the value of LS Type field 805 may indicate a type of the LSA, and may be set to about one, two, three, four, or five to indicate a Router LSA, a Network LSA, an IP Network Summary LSA, an AS Border/Boundary Router (ASBR) Summary LSA, or an AS external LSA (respectively). In the same or other embodiments, the value of LS Type field 805 may be set to about six, nine, ten, or eleven to indicate a Group Membership LSA, a link local opaque LSA, an area local opaque LSA, or an AS scope opaque LSA (respectively). The value of Link State ID field 807 may identify the portion of the internet environment that is being described by the LSA. The value of Advertising Router field 809 may comprise the router ID of the source router (i.e., the router that created the LSA). The value of Link State Sequence Number field 811 may be a 32 bit number, and may be used to indicate an instance of an LSA. The value of Link State Checksum field 813 may comprise a checksum (e.g., a Fletcher checksum) of the complete contents of the LSA, including the LSA header 800 (but excluding the LS Age field 801). The value of Length field 815 may indicate the length (in bytes) of the LSA (including the length of the LSA header 800).

When sending the LSA to a router outside the TTZ, a TTZ (edge) node may set the LS Type field 805 to about one to indicate that an LSA is a router LSA, and set the Link State ID field 807 and the Advertising Router field 809 to the corresponding TTZ ID to indicate the LSA corresponds to the TTZ. Alternatively, the TTZ (edge) node may set both the Link State ID field 807 and the Advertising Router field 809 to the biggest router ID or smallest router ID of the TTZ 360.

Figure 9:
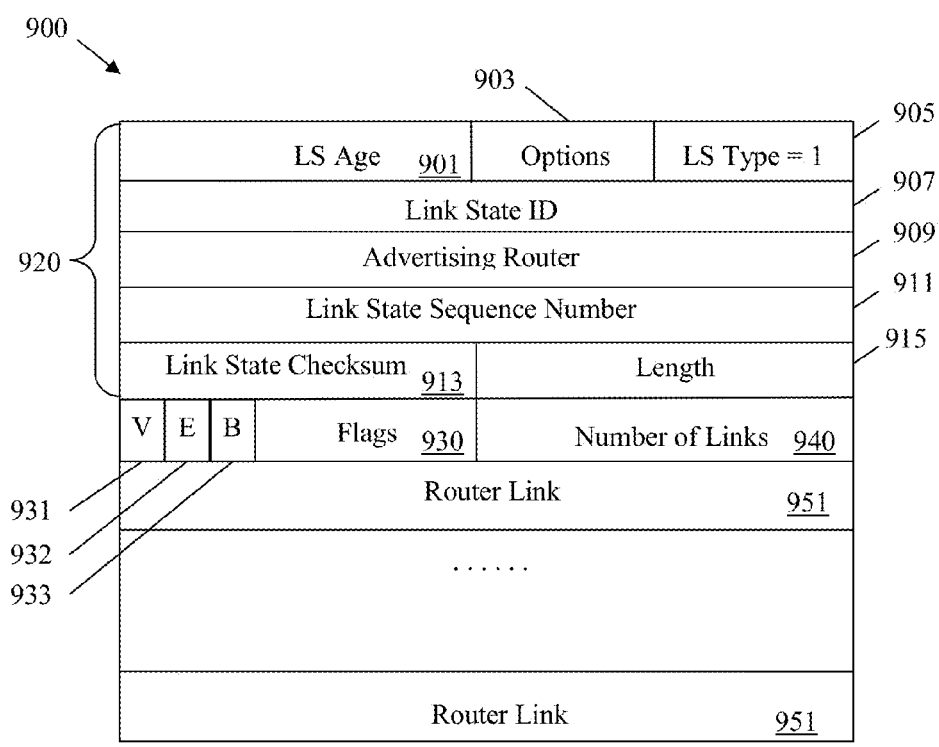
FIG. 9 illustrates an embodiment of a router LSA.

FIG. 9 illustrates an embodiment of a router LSA 900 comprising an LSA header field 920, a Flags field 930, a Number of Links field 940, and a plurality of Router Links 951. The LSA header field 920 in the router LSA 900 may comprise a similar format to the LSA header field 800 described above and may include a LS Age field 901, an Options field 903, an LS-Type field 905, a Link State ID field 907, an Advertising Router field 909, a Link state Sequence Number field 911, a Link State Checksum field 913, and a Length field 915. In an embodiment, the LS Type field 905 may be set to about one to indicate that the LSA 900 is a router LSA.

The Flags 930 may indicate the characteristics of a router that originates the LSA 900, and may comprise a virtual link (V) bit 931, an External (E) bit 932, and a Border (B) bit 933. The V bit 931 may be set to about one to indicate that the source router is an endpoint of one or more fully adjacent virtual links. The E bit 932 may be set to about one to indicate that the source router is an AS boundary router. The B bit 933 may be set to about one to indicate that the source router is an ABR. The Number of Links field 940 may be a 16-bit number and may indicate the number of router links that are described in the Router Links field 950. The Router Links field 950 may comprise a Router Link 951 for each one of the router links in the source router's area (e.g., the TTZ). Each Router Link 951 may describe an individual router link in the TTZ.

Figure 10:
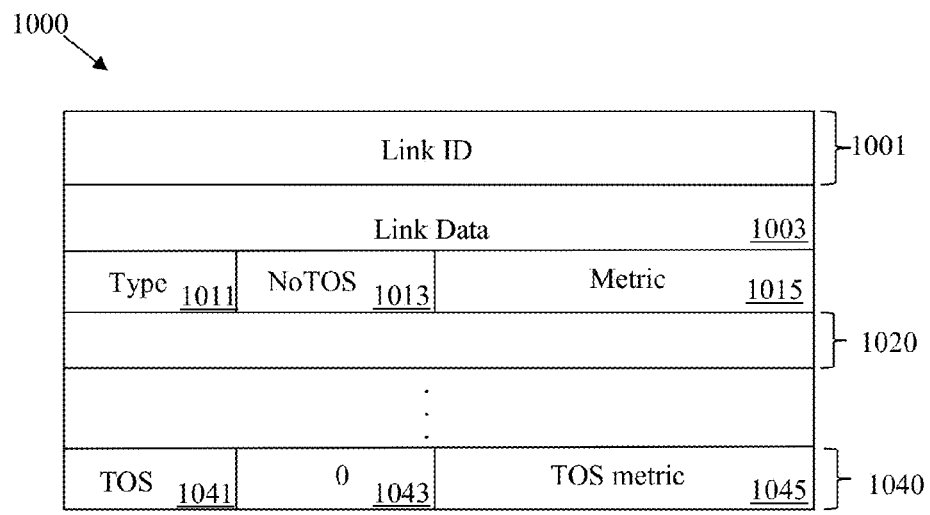
FIG. 10 illustrates an embodiment of a router link field.

FIG. 10 illustrates an embodiment of a router link 1000, which may be similar to the router link 951 described above. The router link 1000 may comprise a Link ID field 1001, a Link Data field 1003, a Type field 1011, a Number of Type of Service (NoTOS) field 1013, a Metric field 1015, and a plurality of type of service (TOS)-specific link metrics field 1020-1040. The Type field 1011 may indicate the kind of link being described in the router link 1000, and may affect all of the other fields 1001, 1003, and 1013-1040 in the router link 1000 (i.e., the values of fields 1001, 1003, and 1013-1040 may vary and/or convey a different meaning depending on the value of the Type field 1011). The Type field 1011 may be set to about one, two, three, or four to indicate that the router link 1000 describes a point-to-point (P2P) connection to another router, a connection to a transit network, a connection to a stub network, or a virtual link (respectively).

The Link ID field 1001 may identify the object that the specific router link connects to, and may depend on the value of the Type field 1011. When the Type field 1011 is set to about one (i.e., indicating that link being described is a P2P link), then the Link ID field 1001 may indicate the router ID of the neighboring router. When the Type field 1011 is set to about two (i.e., indicating that link being described is a transit network link), then the Link ID field 1001 may indicate the IP address of the Designated Router. When the Type field 1011 is set to about three (i.e., indicating that link being described is a stub network link), then the Link ID field 1001 may indicate the IP number of the stub network. When the Type field 1011 is set to about four (i.e., indicating that link being described is a virtual link), then the Link ID field 1001 may indicate the router ID of the neighboring router.

In an embodiment, a TTZ (edge) router may send an LSA comprising a router link 1000 that describes a P2P link when connecting to an external router (i.e., a router outside the TTZ) via a P2P link. The value of the Link ID field 1001 may indicate the router ID of the external router. Alternatively (if the external router receiving the LSA is a TTZ edge router of another TTZ), the source TTZ edge router may (in some instances) set the Link ID field 1001 to indicate the external router's TTZ ID (or alternatively, the biggest/smallest router ID of the TTZ), which may be viewed as the router ID of the TTZ from the point of view of all external routers.

The Link Data field 1003 also depends on the value of Type field 1011. When the Type field 1011 is set to about one, two, or four (i.e., indicating that link being described is a P2P link, a transit network link, or a virtual link), then the Link Data field 1003 may indicate the IP address of the router link. When the Type field 1011 is set to about three (i.e., indicating that link being described is a stub network link), then the value of the Link Data field 1003 is the IP address mask of the stub network.

The NoTOS field 1013 indicates the number of TOS-specific metrics 1020-1040 that are included in the router link 1000. When no TOS-specific metrics are given for the link being described, the NoTOS field 1013 may be set to about zero to indicate that the router link 1000 does not comprise any TOS-specific metrics. Otherwise, the NoTOS field 1013 may comprise an integer corresponding to the number of TOS-specific metrics 1020-1040 that are included in the router link 1000. The Metric field 1015 indicates the cost of the link being described. This Metric 1015 is not a TOS-specific metric 1020-1040 such that the NoTOS field 1013 does not include the Metric 1015 in its count.

Each TOS-specific metric 1020-1040 may have the same format. For instance, the TOS-specific metric 1040 may comprise a TOS field 1041, a field 1043 (e.g., set to about zero), and a TOS metric field 1045. The value of the TOS field 1041 may indicate a service type (e.g., an IP TOS) of the TOS-specific metric being described. The value of the TOS field 1041 may be set to about zero, two, four, eight, or sixteen to indicate that the IP TOS is a normal service, a minimize monetary cost, a maximize reliability, a maximize throughput, or a minimize delay (respectively). The value of the TOS metric 1045 may indicate the cost of the link used for the IP TOS identified by the TOS field 1041.

Figure 11:
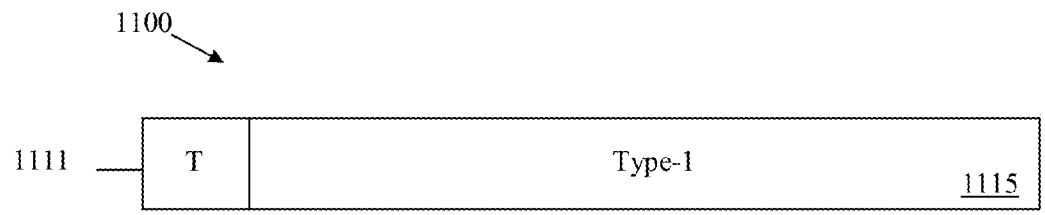
FIG. 11 illustrates an embodiment of a link type field.

FIG. 11 illustrates an embodiment of a link type 1100, which may comprise a TTZ (T) bit flag 1111 and a Type-1 field 1115. The link type field 1100 may be an extension to the link type field 1011 in FIG. 10. The T bit flag 1111 may indicate whether the link is an internal link (i.e., a link inside the TTZ) or an external link (i.e., a link outside the TTZ), and the Type-1 field 1115 may be set to about one, two, three, or four to indicate that the kind of link being described is a P2P connection to another router, a connection to a transit network, a connection to a stub network, or a virtual link (respectively).

In an embodiment, the T bit flag 1111 may be set to about one to indicate that the link is an internal link in the TTZ, or to about zero to indicate that the link is an external link. Consequently (in such an embodiment), the link type 1100 may comprise the same value as the link type 1011 (e.g., since the T bit flag field 1111 is set to zero) when the link is an external link (i.e., a link outside the TTZ), or a value that is one bit different from the value of the link type 1011 (e.g., since the value of the T bit flag field 1111 is set to one) for an internal link (i.e., a link inside the TTZ).

In an alternative embodiment, the T bit flag may be set to about zero to indicate that the link is an internal link in the TTZ, or to about one to indicate that the link is an external link. Consequently (in such an embodiment), the link type 1100 may comprise the same value as the link type 1011 (e.g., since the T bit flag field 1111 is set to zero) when the link is an internal link, or a value that is one bit different from the value of the link type 1011 (e.g., since the value of the T bit flag field 1111 is set to one) for an external link.

As a further alternative, a new field for a TTZ ID may be added into a router link to indicate which TTZ the link belongs to. The new field may be set to about zero to indicate that the corresponding link is a link connecting to a node outside of the TTZ, or to a non-zero value (e.g., a TTZ ID corresponding to a TTZ) to indicate that the link belongs to which TTZ.

Figure 12:
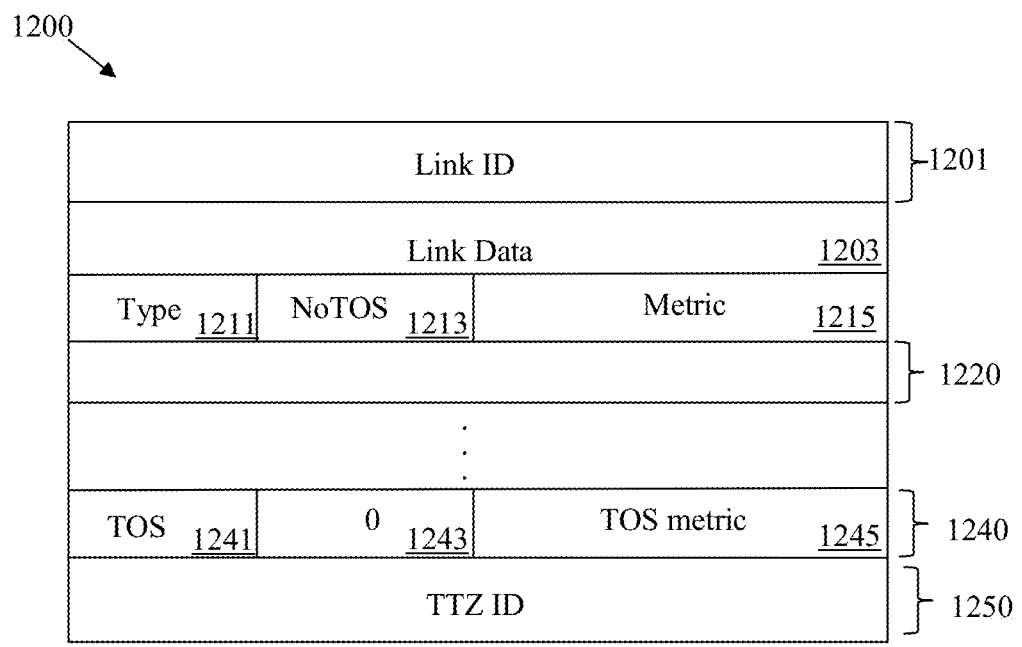
FIG. 12 illustrates an embodiment of a router link with a new field TTZ ID.

FIG. 12 illustrates an embodiment of a router link 1200 with a new field TTZ ID 1250. The router link 1200 may be similar to the router link 900 described above. The router link 1200 may comprise a Link ID field 1201, a Link Data field 1203, a Type field 1211, a Number of Type of Service (No-TOS) field 1213, a Metric field 1215, and a plurality of type of service (TOS)-specific link metrics field 1220-1240. The router link 1200 may also comprise a TOS field 1241, field 1243, and a TOS metric field 1245. These fields may be similar to or the same as those in the router link 900 described above. The field TTZ ID 1250 in the router link 1200 is a new field, which indicates that the link described in the router link 1200 belongs to which TTZ.

In one embodiment, the value about zero in the new field TTZ ID 1250 indicates that the corresponding link described in the router link 1200 is a link connecting to a router outside of the TTZ. In another embodiment, the value of the new field is not zero and is a TTZ ID, which indicates that the link described in the router link 1200 belongs to the TTZ given by the TTZ ID in the new field.

Figure 13:
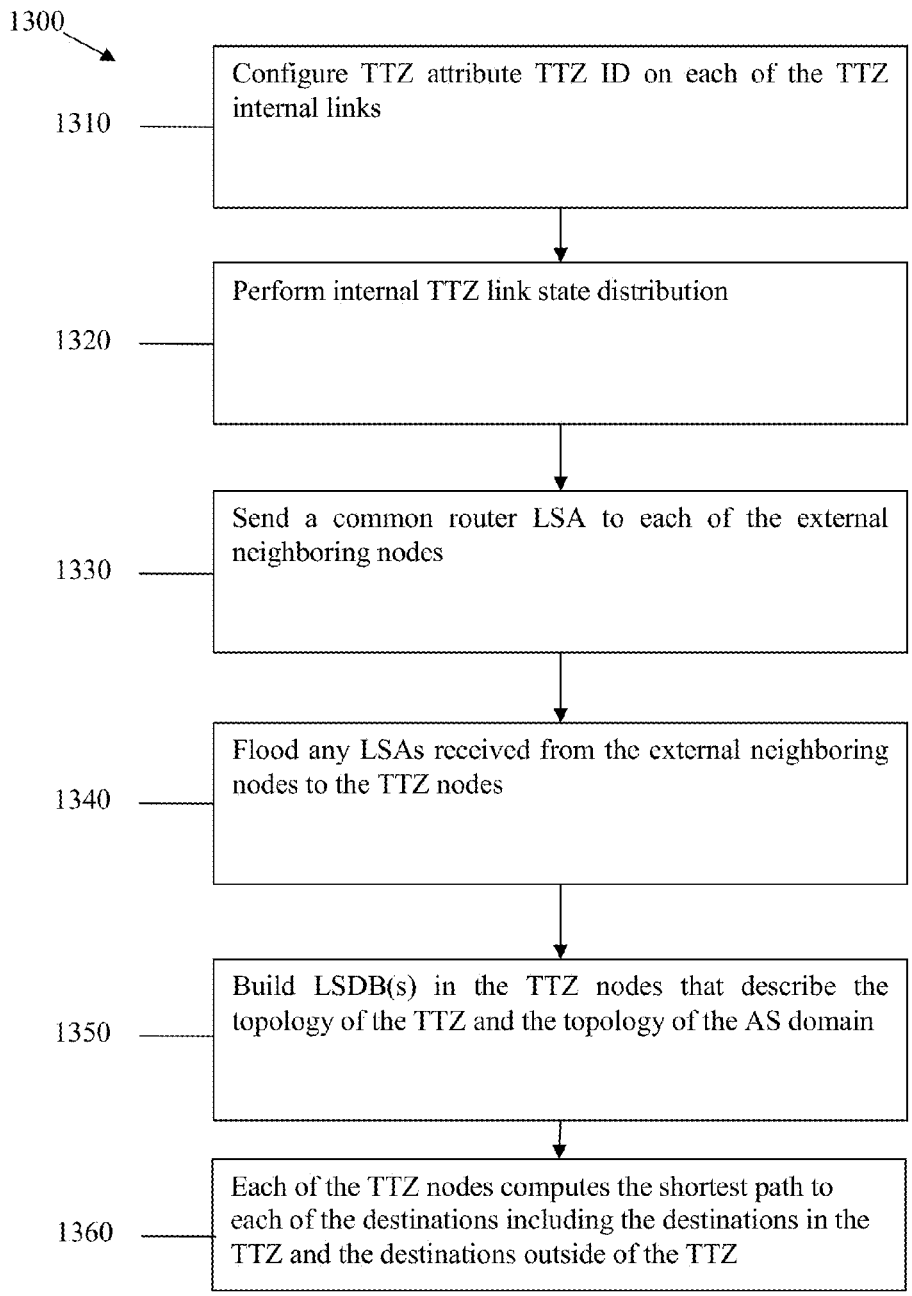
FIG. 13 illustrates an embodiment of a method for setting up a TTZ in an AS domain.

FIG. 13 illustrates a method 1300 for configuring a TTZ in an AS domain. The method 1300 may begin at block 1310, where the TTZ ID may be configured on each of the TTZ's internal links. In some embodiments, the TTZ edge nodes and/or the TTZ internal nodes may perform an intermediate step of exchanging hello packets to learn their own adjacencies prior to the step 1310. The method 1300 may then proceed to block 1320, where an internal TTZ link state distribution may be performed. Specifically, the internal TTZ link state distribution may comprise constructing and flooding LSAs describing each TTZ node's adjacencies to all of the TTZ nodes and to all of the neighboring external nodes. Importantly, the TTZ edge nodes may include descriptions of their external links (i.e., links between the TTZ edge node and an external node) in the LSAs they construct, thereby allowing the other TTZ edge nodes (as well as the TTZ internal nodes) to develop a topological understanding of the external links. As a result of the internal TTZ link state distribution, every TTZ node may derive a topological understanding of the TTZ's inner-topology (i.e., the positional relationship of the TTZ nodes with respect to one another including the internal links) as well as an understanding of the TTZ's adjacencies (i.e., the positional relationship of the TTZ edge nodes to their neighboring external nodes including identification of the external links).

Next, the method 1300 may proceed to the step 1330, where each TTZ edge node may independently construct a common router LSA describing each of the external links, and distribute the common router LSA to the neighboring external nodes to which it is interconnected. The common router LSA may specify a TTZ ID (or alternatively, the largest/smallest Router ID assigned to the TTZ nodes) as the router ID for the TTZ as a single router, and may represent or otherwise describe the TTZ as a single router comprising a plurality of interfaces corresponding to the plurality of external links. Alternatively, one router in the TZZ may be selected as a primary TTZ router, which may be the router in the TTZ with the smallest router ID or largest router ID. The primary TTZ router may construct a common router LSA describing each of the external links, and distribute the common router LSA to the neighboring external nodes through the TTZ nodes.

Next, the method 1300 may proceed to block 1340, where the TTZ edge nodes may flood any LSAs received from the neighboring external nodes throughout the TTZ, thereby allowing the TTZ nodes to develop a topological understanding of the AS domain topology. In some embodiments, the TTZ edge nodes may also distribute LSA received from neighboring external nodes to other neighboring external nodes as may be consistent with the IGP implemented in the AS domain. Although FIG. 13 describes the TTZ edge nodes as receiving LSAs describing the AS domain topology as occurring after the blocks 1310-1360, those of ordinary skill in the art will recognize that such LSAs may be received intermittently during the performance of the method 1300.

Next, the method 1300 may proceed to block 1350, where LSDBs describing the TTZ's inner-topology and the AS domain topology may be built in each of the TTZ nodes, thereby allowing the TTZ nodes to develop a topological understanding of the both TTZ's inner-topology and the AS domain topology. Finally, the method may proceed to block 1360, where each of the TTZ nodes computes the shortest path to each of the destinations, which include the destinations in the TTZ and the destinations outside of the TTZ.

The following embodiments describe link state distributions in the network 300. In an embodiment, each of the links in the TTZ 360 that are connected to the TTZ node 371 may be P2P links. As such, TTZ node 371 may construct and flood a router LSA containing five router links to each of the TTZ nodes 361, 363, 365, 367, and 373. The first router link may describe the P2P connection between TTZ nodes 371 and 361, where the first router link's Link ID field 1001 specifies the router ID of the TTZ node 361. The second router link may describe the P2P connection between TTZ nodes 371 and 363, where the second router link's Link ID field 1001 specifies the router ID of the TTZ node 363. The third router link may describe the P2P connection between TTZ nodes 371 and 365, where the third router link's Link ID field 1001 specifies the router ID of the TTZ node 365. The fourth router link may describe the P2P connection between TTZ node 371 and 367, where the fourth router link's Link ID field 1001 specifies the router ID of the TTZ node 367. The fifth router link may describe the P2P connection between TTZ nodes 371 and 373, where the fifth router link's Link ID field 1001 specifies the router ID of the TTZ node 373. Each of the five router links may comprise a Link Type field 1011, wherein a T bit flag field 1111 set to about one (to indicate that the link is an internal link located entirely within the TTZ), and a Type-1 field 1115 set to about one (to indicate that the described link is a P2P link).

In the same or other embodiments, each of the links connected to the TTZ node 361 may be P2P links. As such, the TTZ node 361 may construct and flood a router LSA containing four router links, one of which is to the external node 315, three of which are to the TTZ nodes 363, 365, and 371. Upon reception, the TTZ nodes 363, 365, and 371 may flood the router LSA to other nodes within the TTZ 360. The first router link may describe the P2P connection between TTZ node 361 and external node 315, where the first router link's Link ID field 1001 specifies the router ID of the node 315. The second router link may describe the P2P connection between TTZ nodes 361 and 363, where the second router link's Link ID field 1001 specifies the router ID of the TTZ node 363. The third router link may describe the P2P connection between TTZ nodes 361 and 365, where the third router link's Link ID field 1001 specifies the router ID of the TTZ node 365. The fourth router link may describe the P2P connection between TTZ nodes 361 and 371, where the fourth router link's Link ID field 1001 specifies the router ID of the TTZ node 371. The first router link may comprise a T bit flag 1111 that is set to about zero (i.e., to indicate that the link is external to the TTZ 360), while each of the second, third, and fourth router links may comprise a T bit flag 1111 that is set to about one (i.e., to indicate that the link is inside the TTZ 360). Each of the four router links may comprise a Type-1 field 1115 that is set to about one (i.e., indicating that the described link is a P2P link).

In the same or other embodiments, each of the links between the TTZ edge nodes 361, 363, 367, and 365 (inside the TTZ 360) and the external nodes 315, 317, 323, 325, 331, and 329 (outside of the TTZ 360) may be P2P links. In such an embodiment, the TTZ edge node 361 may construct a common router LSA that is substantially the same or identical to common router LSAs sent to the external nodes by other TTZ edge nodes, but different from the router LSAs flooded within the TTZ 360. The common router LSA may comprise both a Link State ID 907 and an Advertising Router field 909 that specify a router ID that is equivalent to a TTZ ID associated with the TTZ 360 (or alternatively, the biggest/smallest router ID assigned to the TTZ routers 361-373), as well as comprise six router links that describe the six external links extending from the TTZ edge nodes 361, 363, 365, and 367 to the external nodes 315, 317, 323, 325, 331, and 329 (i.e., the links extending outward from the TTZ edge nodes 361, 363, 365, and 367 to the external nodes 315, 317, 323, 325, 331, and 329), may be sent to the neighboring node 315. From the perspective of the external node 315, the common router LSA may appear to be a normal router LSA, e.g., similar to a router LSA the external node 315 may receive from an adjacent external node (such as the external node 317).

The first router link may describe the P2P connection between the TTZ edge node 361 and the external node 315, where the first router link's Link ID field 1001 specifies the router ID of the external node 315. The second router link may describe the P2P connection between the TTZ edge node 363 and the external node 329, where the second router link's Link ID field 1001 specifies the router ID of the external node 329. The third router link may describe the P2P connection between the TTZ edge node 365 and the external node 317, where the third router link's Link ID field 1001 specifies the router ID of the external node 317. The fourth router link may describe the P2P connection between the TTZ edge node 365 and the external node 323, where the fourth router link's Link ID field 1001 specifies the router ID of the external node 323. The fifth router link may describe the P2P connection between the TTZ edge node 367 and the external node 325, where the fifth router link's Link ID field 1001 specifies the router ID of the external node 325. The sixth router link may describe the P2P connection between the TTZ edge node 367 and the external node 331, where the sixth router link's Link ID field 1001 specifies the router ID of the external node 331. Each of the six router links may comprise a Type field 1011 set to about one to indicate that the link is a P2P link.

Pseudo code for constructing all of the router links to be included in a router LSA RL sent to an external node is described below, where N is a variable for counting the number of external links extending outward from the TTZ.

```
N = 0;
For each router LSA in the TTZ
{
    For each router link in the router LSA
    {
        If the router link is an external link to a node outside of the TTZ
        {
            N = N + 1;
            Add the router link into router LSA RL as a normal link;
        }
        Else If the router link is a stub link
        {
            N = N + 1;
            Add the router link into LSA RL and set cost to 0;
        }
    }
}
```

Set the value of Number of Links field 933 in router LSA RL to N;

The link type 1100 in FIG. 11 may be used as an extension to the link type 1011 in FIG. 10. In an embodiment, the T bit flag 1111 may be set to about one to indicate that the link is an internal link (i.e., extends between two nodes inside a TTZ), or to about zero to indicate that the link is an external link (i.e., extends between a node inside the TTZ and an external node outside the TTZ). In such an embodiment, the above "If statement" may be true when the T bit flag 1111 is set to about zero, or false when the T bit flag 1111 is set to about one. In other embodiments, the T bit flag 1111 may be set to about zero to indicate that the link is an internal link (i.e., extends between two nodes inside a TTZ), or to about one to indicate that the link is an external link (i.e., extends between a node inside the TTZ and an external node outside the TTZ). In such embodiments, the above "If statement" may be true when the T bit flag 1111 is set to about one, or false when the T bit flag 1111 is set to about zero. In either case, the router link for the external link may be added into the router LSA RL as a normal link when the "If statement" is true.

The computation of the routing table on a router outside of a TTZ is the same as that described in RFC 2328. On a router inside the TTZ, it has the same procedure flow as that is described in RFC 2328, but extends the meaning of a link and an association between two vertexes. A link between two vertexes can be a TTZ link. It can also be a normal link.

On a router inside the TTZ, when examining the LSA associated with vertex V, for each link described in the LSA, supposing that vertex W is the other end of the link, if it is a normal link, then vertex W is an adjacent vertex of vertex V; if it is an internal TTZ link and the LSA is generated by a router in a TTZ, then vertex W can be considered as an adjacent vertex of vertex V; if it is an external TTZ link and the LSA is generated by a TTZ edge router, then vertex W, which is the other end of the external TTZ link and outside of the TTZ, can be considered as an adjacent vertex of vertex V.

The routing table on a router inside the TTZ may be computed in the following way. The cost/metric of a link (including external TTZ link) outside of the TTZ is considered as a special type of metrics. This type of metrics is an order of magnitude larger than that of metrics of a link inside the TTZ. That is that any metric of this special type is considered greater than the cost of any path internal to the TTZ. The path to every destination is computed through constructing a shortest path tree from the router in the TTZ to every destination, which includes the destination in the TTZ and the destination outside of the TTZ.

Alternatively, the routing table on a router inside the TTZ may be computed in two phases. In the first phase, the path to every destination in the TTZ is computed. Then in the second phase, the path to every destination outside of the TTZ is computed from the shortest path tree built in the first phase and after setting the cost of the path to every destination in the TTZ to a minimum cost such as about one or zero. In another embodiment, the path to every destination outside of the TTZ may be computed from the shortest path tree built in the first phase and after setting the cost of the path to every edge router of the TTZ to a minimum cost such as about one or zero.

Although novel aspects of this disclosure may be described in relation to the OSPF protocol, those of ordinary skill in the art will recognize that these novel aspects can be applied to other IGP protocols as well (e.g., IS-IS, etc.).

Figure 14:
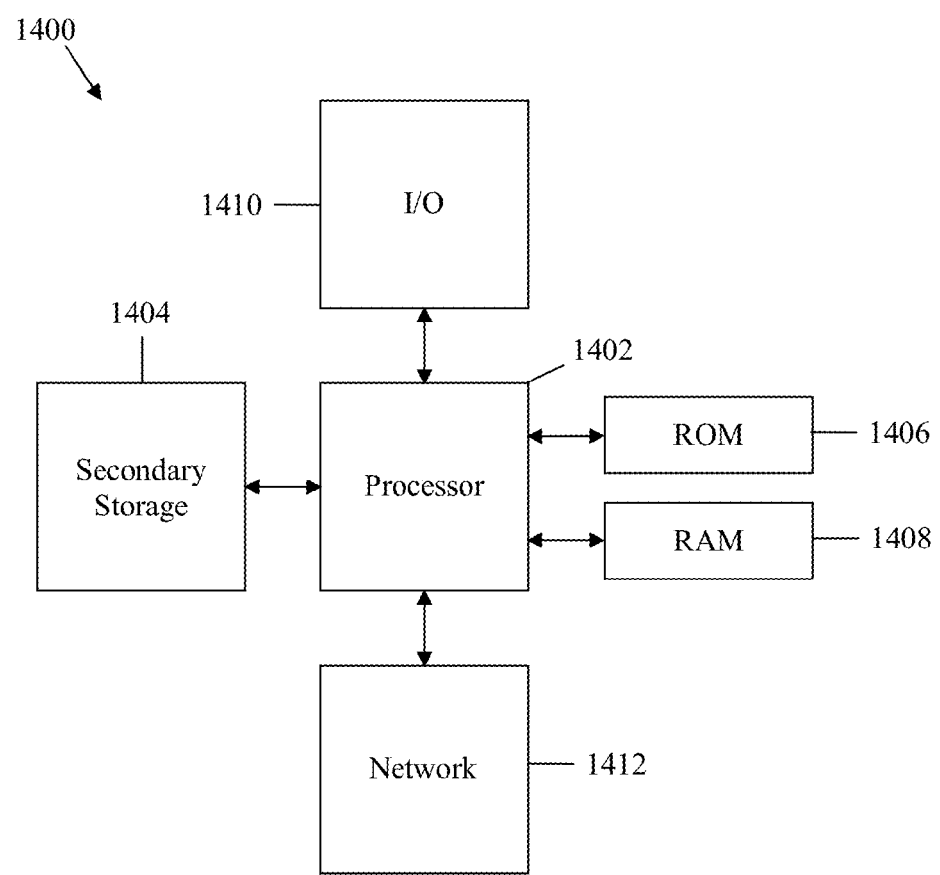
FIG. 14 illustrates a schematic diagram of an embodiment of a network unit for transporting data through a network.

The network components described above may be implemented on any general-purpose network component, such as a computer or network component with sufficient processing power, memory resources, and network throughput capability to handle the necessary workload placed upon it. FIG. 14 illustrates a typical, general-purpose network component 1400 suitable for implementing one or more embodiments of the components disclosed herein. The network component 1400 includes a processor 1402 (which may be referred to as a central processor unit or CPU) that is in communication with memory devices including secondary storage 1404, read only memory (ROM) 1406, random access memory (RAM) 1408, input/output (I/O) devices 1410, and network connectivity devices 1412. The processor 1402 may be implemented as one or more CPU chips, or may be part of one or more application specific integrated circuits (ASICs).

The secondary storage 1404 is typically comprised of one or more disk drives or erasable programmable ROM (EPROM) and is used for non-volatile storage of data. Secondary storage 1404 may be used to store programs that are loaded into RAM 1408 when such programs are selected for execution. The ROM 1406 is used to store instructions and perhaps data that are read during program execution. ROM 1406 is a non-volatile memory device that typically has a small memory capacity relative to the larger memory capacity of secondary storage 1404. The RAM 1408 is used to store volatile data and perhaps to store instructions. Access to both ROM 1406 and RAM 1408 is typically faster than to secondary storage 1404.

Figure 15:
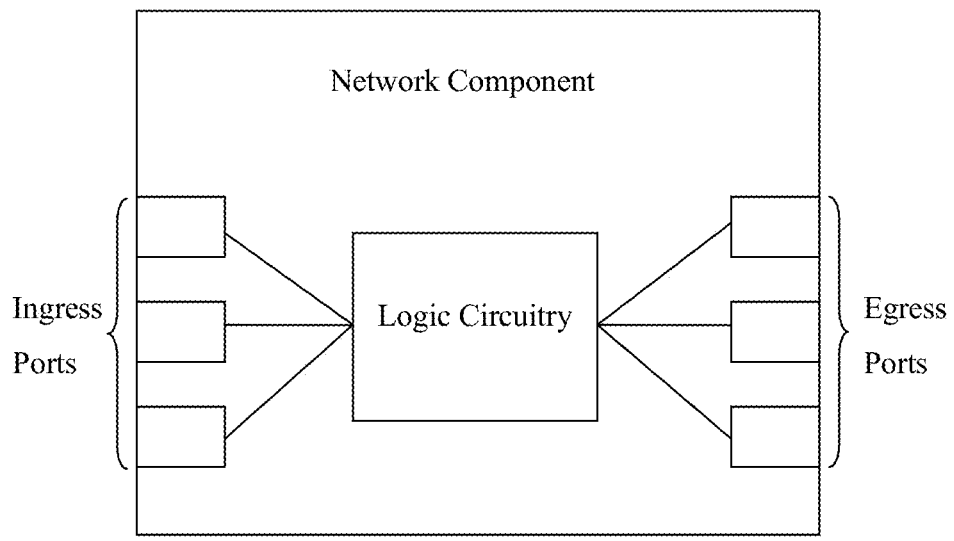
FIG. 15 illustrates a schematic diagram of an embodiment of a general-purpose network component.

At least some of the features/methods described in the disclosure may be implemented in a network apparatus or component, such as a network node. For instance, the features/methods in the disclosure may be implemented using hardware, firmware, and/or software installed to run on hardware. The network apparatus/component or node may be any device that transports frames through a network, e.g. a switch, router, bridge, server, etc. As shown in FIG. 15, the network apparatus/component 1500 may comprise a plurality of ingress ports or units for receiving frames from other nodes, logic circuitry to determine which nodes to send the frames to, and a plurality of egress ports or units for transmitting frames to the other nodes. The ingress and/or egress ports may contain electrical and/or optical transmitting and/or receiving components.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented in a Topology Transparent Zone (TTZ) edge router, the method comprising:
   distributing an internal Link State Advertisement (LSA) within a TTZ without distributing the internal LSA outside of the TTZ, wherein the internal LSA indicates a link state within the TTZ;
   receiving an external LSA indicating a link state outside of the TTZ;
   distributing the external LSA throughout the TTZ;
   originating a virtual LSA that virtualizes the TTZ such that the TTZ is presented as a single router; and
   sending the virtual LSA to an external router outside of the TTZ,
   wherein the internal LSA comprises:
      a link identifier (ID) field that indicates a link; and
      a type field comprising a bit set to indicate the link is an internal link to an internal router inside the TTZ.

2. The method of claim 1, wherein the internal LSA further comprises a TTZ ID field that identifies the TTZ.

3. The method of claim 1, wherein the internal LSA further comprises a bit set to indicate the edge router is a TTZ edge router.

4. The method of claim 1, wherein the virtual LSA comprises:
   a link ID field that indicates a link between the TTZ edge router and the external router; and
   a type field comprising a bit set to indicate the link between the TTZ edge router and the external router is an external link.

5. A method of configuring a topology transparent zone in an Autonomous System domain comprising:
   configuring a topology transparent zone identifier (ID) on a plurality of internal links that interconnect a plurality of topology transparent zone nodes located within the topology transparent zone, wherein each of the internal links interconnects a pair of the topology transparent zone nodes;
   sending a common router advertisement via a plurality of external links to each of a plurality of neighboring external nodes located in the Autonomous System domain, wherein each neighboring external node is connected to at least one of the topology transparent zone nodes via at least one of the external links; and
   building or updating topology tables in the neighboring external nodes based on the common router advertisement, wherein the topology tables describe the topology transparent zone as a single router associated with a router ID that is equivalent to the topology transparent zone ID,
   wherein the topology transparent zone nodes are each assigned a unique router ID, and
   wherein the topology transparent zone ID comprises either a largest or a smallest of the unique router IDs.

6. The method of claim 5, further comprising distributing link state advertisements (LSAs) over the internal links, the LSAs describing an inner-topology of the topology transparent zone, wherein no link state information describing the topology transparent zone's inner-topology is distributed over the external links.

7. The method of claim 6, wherein the topology transparent zone's inner-topology is defined by a positional relationship of the topology transparent zone nodes with respect to one another, and wherein the neighboring external nodes are not aware of the topology transparent zone's inner-topology.

8. A topology transparent zone in an Autonomous System domain comprising:
   a plurality of interconnected topology transparent zone nodes positioned in a topology transparent zone, the topology transparent zone nodes comprising at least some topology transparent zone edge nodes, wherein the topology transparent zone edge nodes are connected to a plurality of neighboring external nodes via a plurality of external links, wherein the neighboring external nodes are positioned in the Autonomous System domain and not positioned in the topology transparent zone; and
   a plurality of internal links each of which interconnects a pair of the topology transparent zone nodes,
   wherein the topology transparent zone nodes exchange a plurality of link state advertisements (LSAs) with one another describing the internal links without distributing any link state information related to an inner-topology of the topology transparent zone to any of the neighboring external nodes,
   wherein a common router advertisement is constructed and distributed to the neighboring external nodes,
   wherein a primary topology transparent zone node constructs and sends the common router advertisement to the neighboring external nodes, and wherein the common router advertisement describes the topology transparent zone as a single router comprising a plurality of interfaces corresponding to the plurality of external links connected to the topology transparent zone, and
   wherein the primary topology transparent zone node is selected from the topology transparent zone nodes for comprising a largest router identifier (ID) or a smallest router ID from among router IDs of the topology transparent zone nodes.

9. The topology transparent zone of claim 8, wherein the topology transparent zone edge nodes construct and send the common router advertisement to the neighboring external nodes, and wherein the common router advertisement describes the topology transparent zone as a single router comprising a plurality of interfaces corresponding to the plurality of external links connected to the topology transparent zone.

10. The topology transparent zone of claim 8, wherein the common router advertisement comprises an interior gateway protocol packet header comprising a router ID field specifying a unique ID associated with the topology transparent zone.

11. The topology transparent zone of claim 10, wherein the unique ID comprises a topology transparent zone ID that is associated with the topology transparent zone, and wherein the topology transparent zone ID is a globally unique identification number.

12. The topology transparent zone of claim 10, wherein the topology transparent zone nodes are each assigned a unique router ID, and wherein the unique ID associated with the topology transparent zone comprises either a largest or a smallest of the unique router IDs.

13. The topology transparent zone of claim 8, wherein the common router advertisement comprises a router LSA comprising:
   an LSA header comprising a link state type field specifying a router LSA type;
   a router links field comprising a plurality of router links each of which describe a different one of the external links; and a number of links field specifying the number of router links in the router links field.

14. A Topology Transparent Zone (TTZ) edge router comprising:
a transmitter configured to:
distribute an internal Link State Advertisement (LSA) within a TTZ without distributing the internal LSA outside of the TTZ, wherein the internal LSA indicates a link state within the TTZ; and
distribute an external LSA throughout the TTZ, wherein the external LSA indicates a link state outside of the TTZ;
a receiver configured to receive the external LSA from outside of the TTZ; and
a processor coupled to the transmitter and the receiver and configured to originate a virtual LSA that virtualizes the TTZ such that the TTZ is presented as a single router,
wherein the transmitter is further configured to send the virtual LSA to an external router outside of the TTZ, and
wherein the internal LSA comprises:
a link identifier (ID) field that indicates a link; and
a type field comprising a bit set to indicate the link is an internal link to an internal router inside the TTZ.

15. The TTZ edge router of claim 14, wherein the internal LSA further comprises a TTZ ID field that identifies the TTZ.

16. The TTZ edge router of claim 14, wherein the internal LSA further comprises a bit set to indicate the edge router is a TTZ edge router.

17. The TTZ edge router of claim 14, wherein the virtual LSA comprises:
a link ID field that indicates a link between the TTZ edge router and the external router; and
a type field comprising a bit set to indicate the link between the TTZ edge router and the external router is an external link.

* * * * *